UNITED STATES PATENT OFFICE.

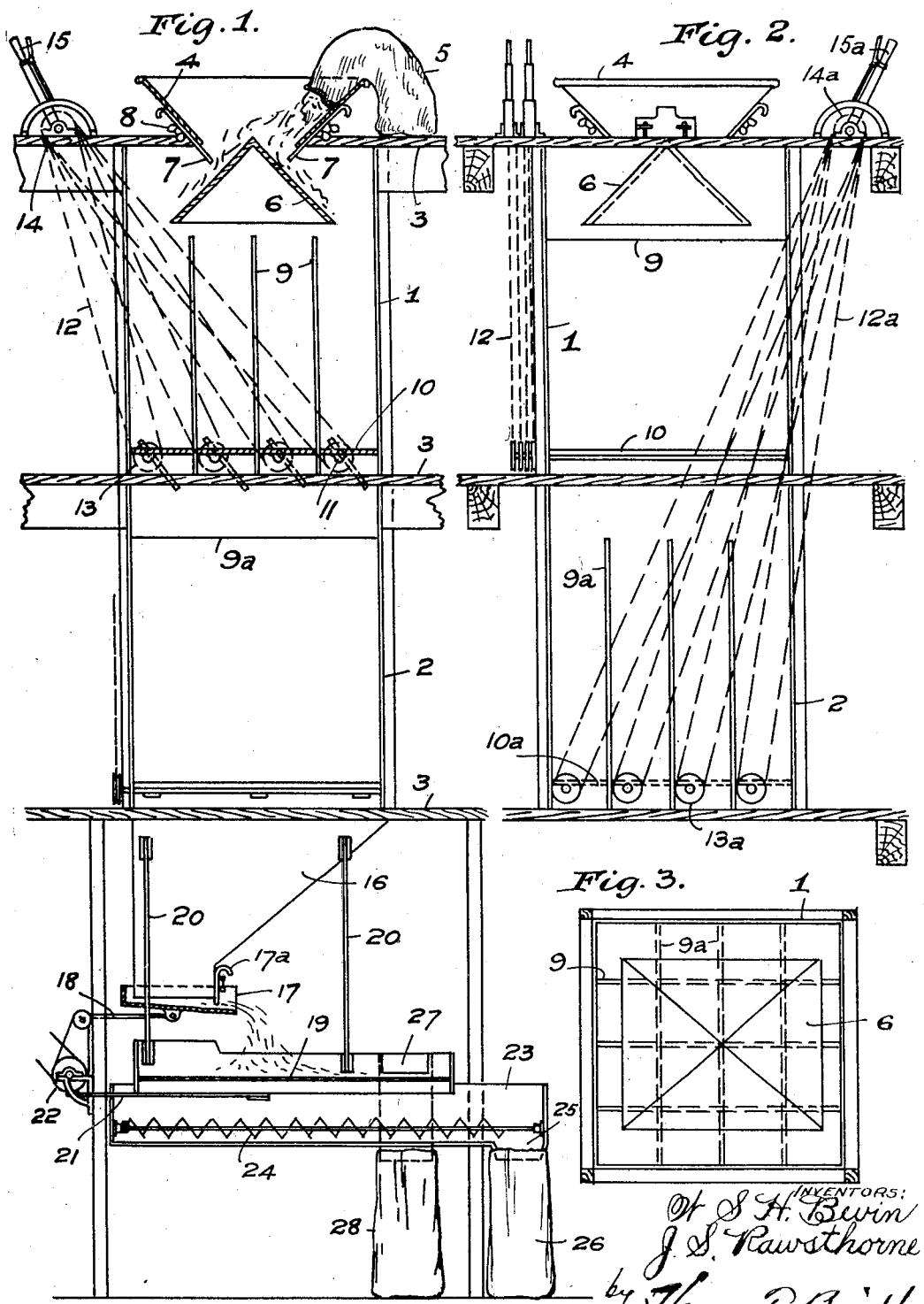

WILLIAM STRETTELL HUMPHREYS BEVIN AND JOHN STANLEY RAWSTHORNE, OF LIVERPOOL, ENGLAND.

MIXING APPARATUS FOR GRANULAR, POWDERED, OR THE LIKE MATERIAL.

1,328,486.   Specification of Letters Patent.   Patented Jan. 20, 1920.

Application filed June 26, 1917. Serial No. 176,984.

*To all whom it may concern:*

Be it known that we, WILLIAM STRETTELL HUMPHREYS BEVIN and JOHN STANLEY RAWSTHORNE, subjects of the King of Great Britain, and residents of Liverpool, England, have invented certain new and useful Improvements in Mixing Apparatus for Granular, Powdered, or the like Material, of which the following is a specification.

This invention relates to an improved mechanism or apparatus whereby various powdered, granular, or other materials of different character or grade may be intimately intermixed, the operation taking place during the passage of the material through the apparatus. While the invention would be suitable for the mixing of any different materials, it is particularly suitable for mixing seeds, grain and the various component meal and the like substances used in the preparation of cattle foods.

According to this invention the apparatus comprises two or more receptacles disposed one above the other, each receptacle having vertical partitions dividing it into a series of smaller compartments somewhat narrow as compared with their length, the partitions of each lower receptacle being also arranged to subdivide it up into a series of smaller compartments disposed at right angles to the compartments in the upper receptacle. The bases of the compartments are arranged as pivoted floors forming a separate outlet valve for each compartment and means are provided for separately operating these outlet valves. Means are also provided, such as a filling hopper and distributing board for controlling the feed of the material to the apparatus and a shaker foot, riddle, and conveyer worm may be provided for delivering the mixed material into sacks or otherwise. The distinguishing feature of the invention lies in the provision of superimposed receptacles divided up into narrow compartments, each series of compartments being disposed at right angles to that below, so that a fraction of the material in each upper compartment is delivered into each compartment of the lower receptacle, thus providing a system of mixing which may be expanded according to the number of receptacles arranged in sequence.

The invention is illustrated in the accompanying drawings in which, Figure 1 is a vertical section of a mixing apparatus in accordance with this invention, Fig. 2 being a side elevation of part of Fig. 1, and Fig. 3 is a plan of the distributing board showing also the transverse arrangement of the subdivided receptacles.

The apparatus consists of several receptacles such as 1, 2, superimposed one upon the other, say, between the floors 3 of a building. The upper receptacle 1 is provided with a filling hopper 4 into which the sacks of the various component materials 5 are emptied. Below the hopper 4 is preferably disposed a distributing board 6, here shown in the pyramidal form, and in order that the amount of material discharged down any of the sloping sides of the board 6 may be varied, adjustable plates 7 may be provided fitted with wing nuts 8, so that by moving the plates 7 with reference to the distributing board 6, the aperture for the passage of material may be regulated. The upper receptacle 1 is divided into a series of narrow transverse compartments by partitions 9, which extend up somewhat close to the distributing board 6, and each compartment is provided with a separate floor 10, pivoted at 11 out of center as shown or otherwise to form a series of delivery valves for the compartments. These pivoted valves may be operated by rods, light chains or stranded wires 12 passing over pulleys 13 at the pivots of the floors 10, and over other pulleys 14 operated by hand levers 15 of any usual pattern. A separate hand lever 15 may be provided for operating each pivoted valve, or one hand lever may be arranged to control two or more valves. The lower receptacle 2 is similarly subdivided into narrow compartments by partitions $9^a$, arranged transversely to the partitions 9, and the compartments in the lower receptacle are also provided with pivoted floors $10^a$, forming separate delivering valves for each compartment, the valves being operated by rods, chains or wires $12^a$, passing around pulleys $13^a$, $14^a$, and being operated by hand levers $15^a$, as previously described. At the base of the lower compartment a collecting hopper 16 is provided, and below, the outlet of this hopper a shaker tray 17 is carried and adapted to be rocked by a rod 18 in any suitable manner. The mixed material passes from the hopper 16 over the tray 17 and on to a riddle 19, which is flexibly suspended by laths 20 and reciprocated by a link 21 in any suitable manner from a pulley 22. The material after passing the riddle falls into a lower tray 23 and may be carried forward by a worm 24 to the delivery outlet 25 where it may be collected into bags 26, any trailings which do not pass the riddle being delivered at the side 27 of the riddle frame into bags 28. An adjustable shutter 17ª, may be fitted to the shaker foot.

In operation, bags of various material are fed into the hopper 4, and a fractional portion of each bag is projected into each compartment of the top receptacle 1, as each succeeding bag is emptied. The compartments, when filled up are composed of strata of the various materials. The end compartment of the upper receptacle 1, is then emptied by opening the valve outlet 10, a portion of its contents being deposited in each compartment of the lower receptacle. The next compartment of the receptacle 1 is then emptied in the same way until all the upper compartments have been delivered to the lower receptacle; the filling operation of the upper receptacle may then be recommenced, while the emptying of the lower receptacle, compartment by compartment, is begun. In this way a very minute intermixture of the material is effected.

We claim—

In an apparatus for intimately admixing granular or powdered material, in combination, an upper receptacle divided into a plurality of compartments, a lower receptacle divided into a plurality of compartments, the compartments of said lower receptacle being arranged transversely of the compartments in the upper receptacle, a separate floor pivoted in each of said upper and lower compartments, and means for tilting said floors upon their pivots, for the purpose set forth.

In testimony whereof we affix our signatures in presence of two witnesses.

WILLIAM STRETTELL HUMPHREYS BEVIN.
JOHN STANLEY RAWSTHORNE.

Witnesses:
A. J. DAVIES,
E. J. McDEVITT.